(12) United States Patent
Zhang et al.

(10) Patent No.: US 11,352,680 B2
(45) Date of Patent: Jun. 7, 2022

(54) APPARATUS AND METHOD FOR RAPIDLY HEATING COLD-ROLLED STRIP STEEL

(71) Applicant: BAOSHAN IRON & STEEL CO., LTD., Shanghai (CN)

(72) Inventors: Huabing Zhang, Shanghai (CN); Guobao Li, Shanghai (CN); Baojun Liu, Shanghai (CN); Dan Han, Shanghai (CN); Xinqiang Zhang, Shanghai (CN); Guanghua Cui, Shanghai (CN); Jianbing Chen, Shanghai (CN); Wen Xiao, Shanghai (CN); Zipeng Zhao, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 176 days.

(21) Appl. No.: 16/650,074

(22) PCT Filed: May 16, 2018

(86) PCT No.: PCT/CN2018/087069
§ 371 (c)(1),
(2) Date: Mar. 24, 2020

(87) PCT Pub. No.: WO2019/080482
PCT Pub. Date: May 2, 2019

(65) Prior Publication Data
US 2020/0291501 A1    Sep. 17, 2020

(30) Foreign Application Priority Data

Oct. 24, 2017    (CN) .......................... 201711004691.2

(51) Int. Cl.
*C21D 11/00*       (2006.01)
*B21B 1/22*        (2006.01)
(Continued)

(52) U.S. Cl.
CPC ............... *C21D 11/00* (2013.01); *B21B 1/22* (2013.01); *C21D 6/002* (2013.01); *C21D 6/005* (2013.01);
(Continued)

(58) Field of Classification Search
CPC .......... C21D 1/42; C21D 11/00; C21D 6/002; C21D 6/005; C21D 6/008; C21D 8/1244;
(Continued)

(56) References Cited

U.S. PATENT DOCUMENTS

2010/0101690 A1\* 4/2010 Koga ....................... C21D 9/46
148/567

FOREIGN PATENT DOCUMENTS

CN       1101652485 A     2/2010
CN       102268516 A     12/2011
(Continued)

OTHER PUBLICATIONS

Wikipedia_Induction_heater (Year: 1998).\*
(Continued)

*Primary Examiner* — Jenny R Wu
(74) *Attorney, Agent, or Firm* — Lei Fang; Smith Tempel Blaha LLC

(57) ABSTRACT

An apparatus and a method for rapidly heating cold-rolled strip steel (10). The apparatus for rapidly heating cold-rolled strip steel (10) comprises a heating zone, a soaking zone, and a cooling zone, and the heating zone is sequentially divided into a first heating section (1), a second heating section (2), a third heating section (3), and a fourth heating section (4) along a moving direction of the strip steel (10) to be heated, the first heating section (1) and the fourth heating section (4) being radiant heating sections, and the second heating section (2) and the third heating section (3) being inductive heating sections. The method for rapidly heating cold-rolled (Continued)

strip steel (10) uses the apparatus for rapidly heating cold-rolled strip steel (10) to heat the strip steel (10).

9 Claims, 1 Drawing Sheet

(51) Int. Cl.
*C21D 6/00* (2006.01)
*C21D 9/52* (2006.01)
*C22C 38/00* (2006.01)
*C22C 38/04* (2006.01)
*C22C 38/06* (2006.01)
*C22C 38/24* (2006.01)
*C22C 38/28* (2006.01)
*C22C 38/34* (2006.01)
*C21D 9/60* (2006.01)

(52) U.S. Cl.
CPC ............... *C21D 6/008* (2013.01); *C21D 9/52* (2013.01); *C21D 9/60* (2013.01); *C22C 38/001* (2013.01); *C22C 38/002* (2013.01); *C22C 38/008* (2013.01); *C22C 38/04* (2013.01); *C22C 38/06* (2013.01); *C22C 38/24* (2013.01); *C22C 38/28* (2013.01); *C22C 38/34* (2013.01); *B21B 2001/225* (2013.01)

(58) Field of Classification Search
CPC ... C21D 9/52; C21D 9/56; C21D 9/60; C21D 9/62; B21B 1/22; B21B 2001/225; C22C 38/001; C22C 38/002; C22C 38/008; C22C 38/04; C22C 38/06; C22C 38/24; C22C 38/28; C22C 38/34; H05B 6/104; H05B 6/362; Y02P 10/25
See application file for complete search history.

(56) References Cited

FOREIGN PATENT DOCUMENTS

| | | | |
|---|---|---|---|
| CN | 102876880 | A | 1/2013 |
| EP | 2133436 | A1 | 12/2009 |
| GN | 102268516 | | 12/2011 |
| GN | 102560070 | | 7/2012 |
| GN | 105369125 | | 3/2016 |
| JP | 06-124775 | A | 5/1994 |
| JP | 1994124775 | A | 5/1994 |
| JP | 2008-266727 | A | 11/2008 |
| JP | 2008266727 | A | 11/2008 |
| JP | 2009-221577 | A | 10/2009 |
| JP | 2009221577 | A | 10/2009 |
| JP | 2009221578 | | 10/2009 |
| JP | 2009221578 | A | 10/2009 |
| JP | 2010222631 | A | 10/2010 |
| JP | 2015-181114 | A | 10/2015 |
| JP | 2015181114 | A | 10/2015 |
| KR | 20160061796 | | 6/2016 |
| KR | 10-2016-0142881 | A | 12/2016 |
| WO | 201517436 | A1 | 11/2015 |

OTHER PUBLICATIONS

KR Decision for Reexamination, Sep. 5, 2020.
AU 1st, 2nd, and 3rd Office Actions.
CA 1st Office Action.
CN 1st and 2nd Office Actions; CN 1st and supp. search reports; CN Notification of Grant.
JP 1st Office Action.
IN 1st Office Action.
International Search Report and Written Opinion dated Aug. 8, 2018 for PCT Patent Application No. PCT/CN2018/087069.
KR 1st Office Action dated Nov. 30, 2021.

* cited by examiner

APPARATUS AND METHOD FOR RAPIDLY HEATING COLD-ROLLED STRIP STEEL

CROSS-REFERENCE TO RELATED APPLICATIONS

This application is a 371 U.S. National Phase of PCT International Application No. PCT/CN2018/087069 filed on May 16, 2018, which claims benefit and priority to Chinese patent application no. 201711004691.2, filed on Oct. 24, 2017. Both of the above-referenced applications are incorporated by reference herein in their entireties.

TECHNICAL FIELD

The invention relates to the technical field of iron and steel production, in particular to an apparatus and a method for rapidly heating a cold-rolled strip steel of oriented silicon steel having a Si content of 4.5 mass % or less.

BACKGROUND ART

In the continuous annealing process of metal strip steel, in order to obtain high-quality products, it is usually necessary to strictly control the heating temperature and heating time. For example, low iron loss and high magnetic induction oriented silicon steel used as transformer cores has extremely strict requirements on temperature management during the decarburization annealing process in its manufacturing process. If the temperature of the strip steel at the outlet of the heating section is too low, the effective decarburization time is reduced and the decarburization effect is poor. If the temperature of the strip steel at the outlet of the heating section is too high, the temperature of the strip steel may exceed the target soaking temperature in a short time, and a dense oxide film may be formed prematurely to hinder decarburization, making the decarburization effect poor. In short, temperature fluctuations in the heating section not only affect the decarburization stability and cause magnetic performance fluctuations, but also greatly increase the surface defect rate in finished products.

In recent years, a rapid heating process has been increasingly used for heat treatment of cold-rolled strip steel of oriented silicon steel. Compared with other rapid heating methods such as rapid electric heating, inductive heating are the most widely used and mature.

For example, Chinese application (CN101652485A) discloses an annealing equipment, the heating section of which can be divided into three sections, wherein the first heating section is a radiant heating section using gas heating or electric heating to heat the strip steel to 50° C. below Curie temperature Tc; the second heating section is a high frequency inductive heating section heating the strip steel to a temperature in a range between 30° C. below Tc and 5° C. below Tc; and the third heating section is similar in structure to the first heating section and is a radiant heating section heating the strip steel to a target temperature above Curie temperature. The main feature of the heating section of the annealing equipment is that a rapid inductive heating section is provided in the middle of the heating section. The major disadvantages of this annealing equipment are: (1) Subject to the maximum capacity of one induction heater, the plate temperature at the outlet of the first heating section should generally not be lower than the value of the Curie temperature Tc−150° C., and the plate temperature at the outlet of the first heating section must be 500° C. or more. For thick strip steel or when the unit speed is fast, the outlet temperature in the first heating section needs to be further increased, otherwise the temperature of the strip steel at the outlet of the second heating section cannot reach or approach the Curie temperature Tc, which will cause the temperature uniformity of the strip steel in the width direction of the strip steel to deteriorate, restricting further improvement of production efficiency. (2) Single rapid temperature rise curve, which is not conducive to accurately controlling the primary recrystallization structure, and restricts the improvement of the magnetic properties of finished products. (3) Due to fluctuations in the surface condition of the cold-rolled strip steel and fluctuations in the heating conditions of the first heating section, the plate temperature at the outlet of the first heating section usually fluctuates greatly. Although the characteristics of the high-frequency inductive heating can be used to stably control the plate temperature at the outlet of the second heating section, the premise is to adopt a complex control scheme similar to that disclosed in the above patent document, which has high requirements for the plate temperature control technology.

Chinese application (CN104603298A) discloses an annealing equipment, the heating section of which can be divided into four sections, wherein the first section is an inductive heating section, equipped with at least one induction heater; the second section is a heating stop zone with a length of 1 to 30 m or a slow heating zone with a heating rate of 0 to 10° C./s, and the plate temperature in the second section is 250 to 600° C.; the third section is also an inductive heating section, which is also equipped with at least one induction heater; and the fourth section is a conventional radiant heating section. It is important to point out that the function of the second section is to make the internal temperature distribution of the strip steel uniform after rapid heating, thereby improving the shape and magnetic properties of the strip steel. The main feature of the heating section of the annealing equipment is that the strip steel is rapidly heated from room temperature to around the Curie temperature Tc by using two or more induction heaters. The shortcomings of this method are: (1) To quickly heat the strip steel from room temperature to around the Curie temperature Tc, at least three or even four induction heaters need to be connected in series, otherwise the product specifications or unit speed are limited; (2) Since the cold-rolled strip steel adopts a very high heating rate before recovery annealing, it is necessary to add a temperature buffer zone of 250-600° C., otherwise the strip shape and magnetic properties will be deteriorated due to stress concentration and uneven temperature; (3) Since the internal height of the induction heater at the inlet is very small, it is necessary to design a special control scheme for the furnace pressure and the protective atmosphere of the heating section, otherwise finished products will have increased surface defects. Therefore, the cost of the equipment for the method is relatively high, and the control of the atmosphere in the furnace is difficult.

In view of the above-mentioned shortcomings of the prior art, the present invention provides an apparatus and a method for rapidly heating a cold-rolled strip steel of oriented silicon steel having a Si content of 4.5 mass % or less. The apparatus and method have high precision in controlling the plate temperature of the heating section, and the obtained product has excellent magnetic properties and surface quality.

SUMMARY OF THE INVENTION

In order to solve the above problems, the present invention provides an apparatus and a method for rapidly heating a cold-rolled strip steel. By connecting two induction heaters in series in the middle of the heating section of a traditional annealing furnace, the apparatus and method of the present invention improve the production efficiency and reduce the energy consumption per ton of steel, while improving the precision of plate temperature control and the quality of finished products.

To achieve the above object, the present invention provides an apparatus for rapidly heating cold-rolled strip steel, comprising a heating zone, a soaking zone, and a cooling zone, wherein the heating zone being sequentially divided into a first heating section, a second heating section, a third heating section, and a fourth heating section along a moving direction of the strip steel to be heated, The first heating section is provided with a first radiant heater utilizing gas heating or electric heating, so that the first heating section can heat the strip steel to a temperature in a range between 200° C. and 100° C. below a target Curie temperature;

The second heating section is provided with a first induction heater with a first induction coil, so that the second heating section can heat the strip steel to a temperature in a range between 300° C. and 50° C. below the target Curie temperature;

The third heating section is provided with a second induction heater with a second induction coil, so that the third heating section can heat the strip steel to a temperature in a range between 30° C. below the target Curie temperature and 3° C. below the target Curie temperature;

The fourth heating section is provided with a second radiant heater utilizing gas heating or electric heating, so that the fourth heating section can heat the strip steel to a temperature above the target Curie temperature.

Further, at least one multi-wavelength first plate thermometer is disposed between the first heating section and the second heating section, at least one multi-wavelength second plate thermometer is disposed between the second heating section and the third heating section, and at least one multi-wavelength third plate thermometer is disposed between the third heating section and the fourth heating section.

Further, the first induction heater includes a first rectifier, a first inverter, and a first oscillation circuit including a first induction coil connected in sequence, the first inverter receives a first direct current provided by the first rectifier, converts the first direct current into a first high-frequency current, and supplies the first high-frequency current to the first oscillation circuit; the second induction heater includes a second rectifier, a second inverter, and a second oscillation circuit including a second induction coil connected in sequence, the second inverter receives a second direct current provided by the second rectifier, converts the second direct current into a second high-frequency current, and supplies the second high-frequency current to the second oscillation circuit.

Further, the first induction heater and the second induction heater have a current frequency in a range of 100-1000 kHz.

The present invention also provides a method for rapidly heating a cold-rolled strip steel, wherein the above-mentioned apparatus for rapidly heating a cold-rolled strip steel is used to heat the strip steel to be heated.

Further, a first target plate temperature at an outlet of the first heating section is 400-550° C.

Further, a second target plate temperature at an outlet of the second heating section is set according to the heating rate in the third heating section, wherein the heating rate in the third heating section is 50-150° C./s.

Further, the power of the second heating section is controlled by the following method: adjusting the heating power of the second heating section according to a comparison result between a second target plate temperature and a detection value from the second plate thermometer.

Further, the power of the third heating section is controlled by the following method: setting an initial power of the third heating section and a third target plate temperature at an outlet of the third heating section, and adjusting the heating power of the third heating section based on the initial power according to a comparison result between the third target plate temperature and a detection value from the third plate thermometer.

Further, the power of the third heating section is controlled by the following method: setting a target impedance for the third heating section, and adjusting heating power of the third heating section according to a comparison result between the target impedance and an running impedance of the third heating section.

In the apparatus and method for rapidly heating a cold-rolled strip steel of the present invention, two induction heaters are connected in series in the middle of the heating zone of a traditional annealing furnace, so that the heating zone is divided into four sections, wherein a first heating section is provided to effectively avoid degradation of the strip shape and magnetic properties of the strip steel caused by direct and rapid heating from room temperature, and two inductive heating sections (i.e., the second heating section and the third heating section are provided, compared with the existing single inductive heating section, such provision shortens the overall length of the heating zone, reduces the initial temperature of rapid heating, thereby improving production efficiency and reducing energy consumption per ton of steel.

DETAILED DESCRIPTION

The structure and working principle of the present invention will be further described below with reference to the drawings.

Figure 1:
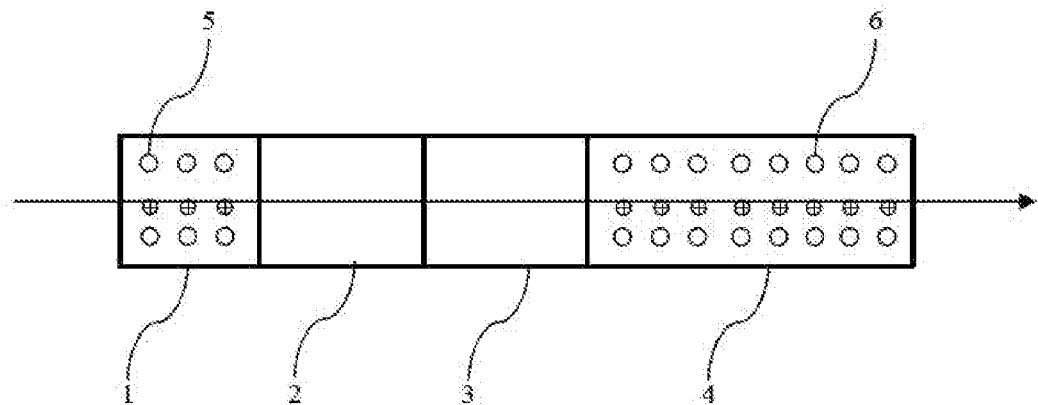
FIG. 1 is a schematic structural diagram of an apparatus for rapidly heating a cold-rolled strip steel according to an example of the present invention.

As shown in FIG. 1, according an example of the present invention, an apparatus for rapidly heating cold-rolled strip steel 10 comprises a heating zone, a soaking zone, and a cooling zone. The heating zone is sequentially divided into a first heating section 1, a second heating section 2, a third heating section 3, and a fourth heating section 4 along a moving direction of the strip steel 10 to be heated. Specifically, the first heating section 1 and the fourth heating section 4 are radiant heating sections, and the second heating section 2 and the third heating section 3 are inductive heating sections.

In an example of the present invention, the first heating section 1 is provided with a first radiant heater 5 utilizing gas heating or electric heating, so that the first heating section 1 can heat the strip steel 10 to a temperature in a range between 200° C. and 100° C. below a target Curie temperature. The selection of the plate temperature at the outlet of the first heating section 1 is mainly based on the safety and economy of the annealing furnace, and also takes into account the requirements for the quality of finished products.

The second heating section 2 is provided with a first induction heater with a first induction coil, so that the second heating section 2 can heat the strip steel 10 to a temperature in a range between 300° C. and 50° C. below the target Curie temperature. The selection of the plate temperature at the outlet of the second heating section 2 is mainly based on the requirements for the magnetic properties of finished products, and also takes into account the use efficiency of the induction heater.

The third heating section 3 is provided with a second induction heater with a second induction coil, so that the third heating section 3 can heat the strip steel 10 to a temperature in a range between 30° C. below the target Curie temperature and 3° C. below the target Curie temperature. The closer the plate temperature at the outlet of the third heating section 3 is to the target Curie temperature, the better the temperature uniformity of the strip steel 10 in the width direction is, and the higher the use efficiency of the induction heater is. In addition, when the strip steel 10 reaches or approaches the target Curie temperature, a magnetic transition occurs, the magnetic permeability of the strip steel 10 decreases sharply, and the heating efficiency of the strip steel 10 also decreases rapidly. At this time, the voltage fluctuation of the induction heater is large, which will affect the temperature uniformity of the strip steel 10 in the longitudinal direction and the stable operation of the induction heater.

The fourth heating section 4 is provided with a second radiant heater 6 utilizing gas heating or electric heating, so that the fourth heating section 4 can heat the strip steel 10 to a temperature above the target Curie temperature, thereby completing the heating process of the strip steel 10.

In an example of the present invention, at least one multi-wavelength first plate thermometer is disposed between the first heating section 1 and the second heating section 2, at least one multi-wavelength second plate thermometer is disposed between the second heating section 2 and the third heating section 3, and at least one multi-wavelength third plate thermometer is disposed between the third heating section 3 and the fourth heating section 4, so that the plate temperature at the outlet of each heating section can be measured accurately. In an example of the present invention, the first plate thermometer, the second plate thermometer, and the third plate thermometer can all adopt infrared temperature sensors, the working principle of which is to measure the surface temperature of the strip steel 10 in a non-contact manner. Multiple-wavelength thermometer can compensate for variable emissivity, light interference, and temperature calibration, and thus has higher precision when measuring temperature at low-temperatures or in steam-containing atmospheres.

Specifically, at least one first plate thermometer is provided between the first heating section 1 and the second heating section 2 for detecting the plate temperature at the outlet of the first heating section 1.

At least one second plate thermometer is provided between the second heating section 2 and the third heating section 3 for detecting the actual plate temperature of strip steel 10 at the position of the thermometer. This position is not affected by the working state of the radiant tube in the first heating section 1 and the fourth heating section 4, and thus has good detection environment. However, the plate temperature at this position is usually lower than 700° C., and the emissivity of the strip steel 10 is easily affected by the surface state of the strip steel 10. Therefore, it is preferable to improve the measurement precision with a multi-wavelength plate thermometer.

At least one third plate thermometer is provided between the third heating section 3 and the fourth heating section 4 for detecting the actual plate temperature of strip steel 10 at the position of the thermometer. The plate thermometer at this position is easily affected by the radiant tube in the fourth heating section 4. Also, the plate temperature at the outlet of the third heating section 3 is usually 750° C. or less, and the emissivity of the strip steel 10 is easily affected by the surface state of the strip steel 10. Therefore, although the measurement precision can be improved by a preferred multi-wavelength plate thermometer, considering the importance of longitudinal/transverse plate temperature control at the outlet of the third heating section 3, this measurement precision cannot usually be used directly for feedback control of plate temperature.

Figure 2:
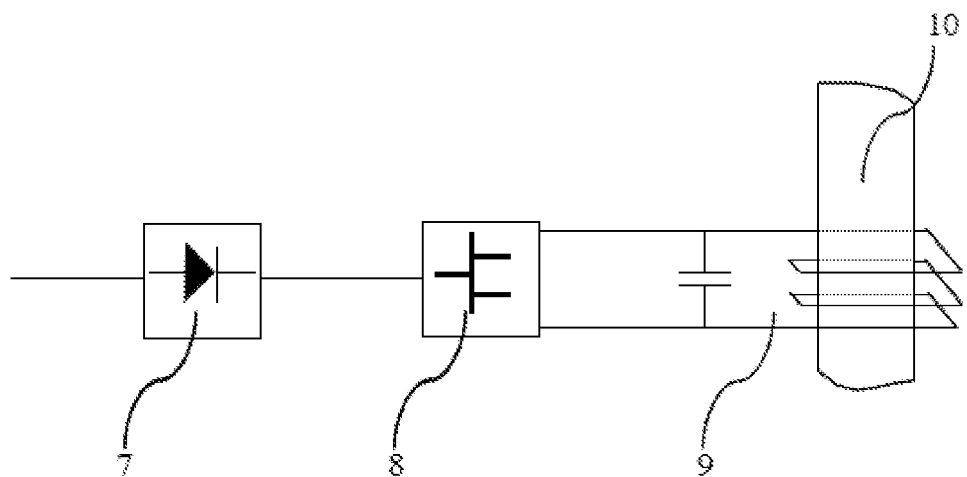
FIG. 2 is a schematic structural diagram of a first induction heater according to an example of the present invention.

In an example of the present invention, as shown in the schematic structural diagram of a first induction heater shown in FIG. 2, the first induction heater includes a first rectifier 7, a first inverter 8, and a first oscillation circuit 9 including a first induction coil connected in sequence, the first rectifier 7 supplies a first direct current to the first inverter 8 composed of transistors, and then the first inverter 8 supplies a first high-frequency current to the first oscillation circuit. The second induction heater, which is similar to the first induction heater, includes a second rectifier, a second inverter, and a second oscillation circuit including a second induction coil connected in sequence, the second rectifier supplies a second direct current to the second inverter composed of transistors, and then the second inverter supplies a second high-frequency current to the second oscillation circuit.

The frequency of the excitation current of the induction heater has an important influence on the penetration depth of the induction current. The lower the frequency of the exciting current is, the deeper the penetration of the induced current is. If the thickness of the strip steel 10 is less than 2.5 times the penetration depth, the current will be greatly weakened, making it difficult to perform low-cost heating. Therefore, if the current frequency of the first induction heater and the second induction heater is lower than 100 kHz, the penetration depth of the induction current is deep, and the heating rate of the surface of the strip steel 10 is slow, which makes it difficult to meet the process requirements of thin strip steel 10. If the current frequency is higher than 1000 kHz, the manufacturing cost of the induction heater increases significantly. To solve this problem, in an example of the present invention, the first induction heater and the second induction heater have a current frequency in a range of 100-1000 kHz, preferably in a range of 300-700 kHz. In this way, it can meet the rapid heating requirements of extremely thin oriented silicon steel such as 0.15 mm thickness, and it can also control the manufacturing cost of the induction heater at a reasonable level.

The present invention also provides a method for rapidly heating a cold-rolled strip steel 10, wherein the above-mentioned apparatus for rapidly heating a cold-rolled strip steel 10 in examples of the present invention is used to heat the strip steel 10 to be heated.

In an example of the present invention, the selection of the plate temperature at the outlet of the first heating section 1 is mainly based on the safety and economy of the annealing furnace, and also takes into account the requirements for the quality of finished products. If the first target plate temperature $T_1$ at the outlet of the first heating section 1 is lower than 400° C., the internal furnace temperature of the first heating section 1 is usually lower than 750° C., which causes a hidden safety hazard in the annealing furnace in the case of a high hydrogen protective atmosphere. If the first target plate temperature $T_1$ at the outlet of the first heating section 1 is higher than 550° C., the induction heater has a reduced operating economy. Therefore, the first target plate temperature $T_1$ of the first heating section 1 is 400-550° C. In addition, a first radiant heater 5 is used at a temperature of 400° C. or lower. The first radiant heater 5 has high heating efficiency and makes the temperature uniformity of the strip steel 10 in the width direction good, and can further reduce operating energy consumption by utilizing the heat of exhaust gas in soaking zone.

In an example of the present invention, the second target plate temperature at the outlet of the second heating section 2 is set according to the heating rate in the third heating section 3. From the perspective of the magnetic properties of finished products, the heating rate in the third heating section 3 is preferably 50 to 150° C./s. After the heating rate in the third heating section 3 is determined, the second target plate temperature $T_2$ in the second heating section 2 is determined according to the formula: $T_2=T_3-V_2/V_1 \times L_2$, wherein $T_3$ is the plate temperature at the outlet of the third heating section 3, $L_2$ (m) is the coil length of the second induction heater, $V_1$ (m/s) is the moving speed of the strip steel 10, and $V_2$ (° C./s) is the heating rate in the third heating section 3.

In an example of the present invention, the power of the second heating section 2 is controlled by the following method: adjusting the heating power of the second heating section 2 according to the comparison result between the second target plate temperature $T_2$ and the detection value from the second plate thermometer. Specifically, the second target plate temperature may be set as a predetermined value $T_{2A}$ by a control program, and the detection value from the second plate thermometer and the predetermined value $T_{2A}$ of the second target plate temperature are compared. The induction heating power is dynamically adjusted so that the plate temperature at the outlet of the second heating section 2 approaches the predetermined value $T_{2A}$ of the second target plate temperature, thereby achieving stable control of the plate temperature at the outlet of the second heating section 2. The operating voltage and operating current of the induction heater are dynamically adjusted according to the difference between $T_2$ and $T_{2A}$.

In an example of the present invention, the power of the third heating section 3 is controlled by the following method: setting the initial power of the third heating section 3 and the third target plate temperature at the outlet of the third heating section 3, and adjusting the heating power of the third heating section 3 based on the initial power according to a comparison result between the third target plate temperature and a detection value from the third plate thermometer.

Specifically, calculation formula of initial power $P_{20}$ is as follows:

$$P_{20}=f(\rho,E,R,\theta,W,V1,\Delta T)$$

wherein $\rho$ is the density of strip steel 10, E is the specific energy of strip steel 10, and R is the resistivity of strip steel 10, these are characteristic parameters of strip steel 10; $\theta$ is the thickness of strip steel 10, W is the width of strip steel 10, these are size parameters of strip steel 10; V1 is the moving speed of strip steel 10, $\Delta T$ is the predetermined temperature difference, these are process parameters. The calculation formula of the initial power $P_{20}$ is a theoretical formula. The calculation formula in an actual production process can be obtained by fitting the characteristic parameters of strip steel 10, the size parameters of strip steel 10, and the process parameters based on the outlet plate temperature.

For strip steel 10 of the same material, the calculation formula of initial power $P_{20}$ can be simplified as:

$$P_{20}=K1 \times f(\theta,W,V1,\Delta T)$$

wherein K1 is a constant related to material characteristics. In an actual production process, different K1 values are given according to different strip steel 10 having different characteristics.

The third target plate temperature at the outlet of the third heating section 3 may be set as a predetermined value $T_{3A}$ by a control program, and the detection value from the third plate thermometer and the predetermined value $T_{3A}$ of the third target plate temperature are compared. The induction heating power is dynamically adjusted so that the plate temperature at the outlet of the third heating section 3 approaches the predetermined value $T_{3A}$ of the third target plate temperature. It can be seen that this setting method is equivalent to adding a dynamic compensation module based on the predetermined value $T_{3A}$ of the third target plate temperature on the basis of the initial power. In order to conveniently control the temperature of the dynamic compensation module, it is necessary to monitor the plate temperature in real time. Therefore, at least two third plate thermometers may be provided between the third heating section 3 and the fourth heating section 4, wherein at least one third plate thermometer is used for plate temperature compensation, and at least one third plate thermometer is used for plate temperature monitoring.

In another example of the present invention, the power of the third heating section 3 is controlled by the following method: setting the target impedance of the third heating section 3, and adjusting the heating power of the third heating section 3 according to the comparison result of the target impedance and the running impedance of the third heating section 3. Specifically, the running impedance $Z_2=U_2/I_2$ of the second induction heater in the third heating section 3 is tracked, wherein $U_2$ is the running voltage of the second induction heater, and $I_2$ is the running current of the second induction heater. When the strip steel 10 reaches or approaches the Curie temperature Tc, a magnetic transition occurs, which causes the impedance of the strip steel 10 to change. This physical characteristic can be used to further stabilize the outlet plate temperature by controlling the impedance of the strip steel 10. The target impedance $Z_{2A}$ of the second induction heater may be set by a control program, and the running impedance $Z_2$ and the target impedance $Z_{2A}$ are compared to dynamically adjust the induction heating power so that the running impedance $Z_2$ approaches the target impedance $Z_{2A}$. That is, a dynamic compensation module based on the target impedance $Z_{2A}$ is added on the basis of the initial power. In an actual production process, the target impedance $Z_{2A}$ is determined based on the inductive heating theory and the process requirements, and the influence of the width of the strip steel 10 also needs to be considered.

The following describes the effects of the present invention in detail with reference to several embodiments.

Embodiment 1

A slab is processed according to the following steps: heating the slab at 1150° C., and then performing hot-rolling to obtain a hot-rolled plate with a thickness of 2.3 mm; normalizing annealing; cold-rolling the plate to the target thickness, wherein the cold-rolled thickness is 0.29 mm; cleaning the surface of the cold-rolled strip steel to remove rolling oil and iron; decarburization annealing using the traditional radiant tube, the annealing equipments described in the Chinese patent (CN101652485A) and examples of the present invention as the decarburization annealing unit, respectively; performing nitriding treatment; coating the steel sheet with a MgO coating, and then annealing at a high temperature of 1200° C. for 20 hours in a 100% $H_2$ atmosphere; applying an insulating coating, and performing hot-stretching and temper-rolling annealing to obtain a finished oriented silicon steel product. Wherein the slab comprises the following chemical composition thereof by mass percentages:

C: 0.035~0.120%, Si: 2.9~4.5%, Mn: 0.05~0.20%, P: 0.005~0.050%, S: 0.005~0.012%, Als: 0.015~0.035%, N: 0.001~0.010%, Cr: 0.05~0.30%, Sn: 0.005~0.200%, V: ≤0.0100%, Ti: ≤0.0100%.

The energy consumption per ton of steel of the decarburization annealing unit and the decarburization effect of the strip steel are tested under different test conditions, and the results are shown in Table 1. Comparative Examples 1 and 2 show test data obtained using a conventional radiant tube, Comparative Examples 3 to 5 show test data obtained using the equipment of Chinese patent (CN101652485A), and Examples 1 to 5 show test data of the embodiments of the present invention.

TABLE 1

Comparison table of test data under different test conditions

| | Unit speed (m/min) | Plate temperature $T_1$ (° C.) at outlet of first heating section | Carbon content after decarburization (ppm) | Reduction rate of energy consumption per ton of steel (%) |
|---|---|---|---|---|
| Comparative Example 1 | 90 | — | <30 | Baseline energy consumption |
| Comparative Example 2 | 95 | — | 48 | 4.7% Reduction |
| Comparative Example 3 | 90 | 600 | <30 | 4.0% Reduction |
| Comparative Example 4 | 90 | 550 | 41 | 4.9% Reduction |
| Comparative Example 5 | 95 | 600 | 33 | 8.2% Reduction |
| Example 1 | 90 | 550 | <30 | 4.7% Reduction |
| Example 2 | 90 | 500 | <30 | 6.1% Reduction |
| Example 3 | 90 | 400 | <30 | 7.6% Reduction |
| Example 4 | 95 | 520 | <30 | 10.6% Reduction |
| Example 5 | 98 | 540 | <30 | 12.5% Reduction |

According to Table 1, the energy consumptions are compared with the energy consumption per ton of steel of Comparative Example 1 as the baseline. Both Comparative Example 1 and Comparative Example 2 used a conventional radiant tube for heating. Comparative Example 1 had a unit speed of 90 m/min, which is a baseline energy consumption. In Comparative Example 2, the unit speed is increased to 95 m/min, the energy consumption per ton of steel is reduced by 4.7%, but the decarburization effect is poor, with a carbon content of 48 ppm after decarburization.

Comparative Examples 3 to 5 used the three-stage heating method disclosed in Chinese Patent (CN101652485A). In Comparative Example 3, the unit speed is 90 m/min, the plate temperature $T_1$ at the outlet of the first heating section is 600° C., and the energy consumption per ton of steel decreased by 4.0%. In Comparative Example 4, the unit speed is 90 m/min, the plate temperature $T_1$ at the outlet of the first heating section is 550° C., and the energy consumption per ton of steel decreased by 4.9%. However, in Comparative Example 4, because the initial temperature of the rapid heating process is too low, and the working capacity of one induction heating device is limited, the end temperature of the rapid heating process is low, resulting in poor decarburization effect, with a carbon content of 41 ppm after decarburization. In Comparative Example 5, the unit speed is 95 m/min, the plate temperature at the outlet of the first heating section is 600° C., and the energy consumption per ton of steel decreased by 8.2%. Similarly, in Comparative Example 5, because the working capacity of one induction heating device is limited, the carbon content after decarburization is still relatively high, being 33 ppm.

In Examples 1 to 3, the unit speed is 90 m/min, the plate temperatures at the outlet of the first heating section are 550° C., 500° C., and 400° C., respectively, the energy consumption per ton of steel decreased by 4.7%, 6.1%, and 7.6%, respectively, and the carbon content after decarburization meets the requirements of less than 30 ppm. In Example 4, the unit speed is 95 m/min, the plate temperature at the outlet of the first heating section is 520° C., and the energy consumption per ton of steel decreased by 10.6%. In Example 5, the unit speed is 98 m/min, the initial temperature of rapid heating is 540° C., and the energy consumption per ton of steel decreased by 12.1%. In Comparative Examples 9 and 10, carbon contents after decarburization satisfy the process requirements. It can be seen that under the same conditions, the energy consumption per ton of steel in the technical solutions of the present invention is significantly reduced.

Embodiment 2

The Embodiment 2 adopts the same manufacturing steps as the Embodiment 1, and the cold-rolled thickness is 0.29 mm. The apparatus for rapidly heating a cold-rolled strip steel according to the present invention is used as a decarburization annealing unit, and the speed of which is 90 m/min. A multi-wavelength first plate thermometer is disposed between the first heating section and the second heating section, a multi-wavelength second plate thermometer is disposed between the second heating section and the third heating section, and two multi-wavelength third plate thermometers are disposed between the third heating section and the fourth heating section. Table 2 lists plate temperatures under different inductive heating power control modes.

TABLE 2

Plate temperatures under different inductive heating power control modes.

| | Mean plate temperature at outlet of first heating section (° C.) | Mean variance of plate temperatures at outlet of first heating section (° C.) | Mean plate temperature at outlet of second heating section (° C.) | Mean variance of plate temperatures at outlet of second heating section (° C.) | Mean plate temperature at outlet of third heating section (° C.) | Mean variance of plate temperatures at outlet of third heating section (° C.) | Surface defect rate (%) |
|---|---|---|---|---|---|---|---|
| Comparative Example 6 | 500.1 | 5.5 | 585.8 | 6.8 | 719.3 | 5.1 | 6.0% |
| Example 6 | 500.3 | 5.1 | 585.0 | 0.08 | 729.8 | 1.3 | 1.5% |
| Example 7 | 500.5 | 5.7 | 585.0 | 0.08 | 730.5 | 1.0 | <0.5% |
| Example 8 | 499.8 | 5.8 | 585.0 | 0.08 | 733.1 | 0.6 | <0.5% |

In Comparative Example 6, both the first induction heater and the second induction heater use an initial power mode, where the initial power of the first induction heater is 150 KW, and the initial power of the second induction heater is 430 KW. The mean plate temperature at the outlet of the first heating section is 500.1° C. and the mean variance thereof is 5.5° C.; the mean plate temperature at the outlet of the second heating section is 585.8° C. and the mean variance thereof is 6.8° C.; and the mean plate temperature at the outlet of the third heating section is 719.3° C. and the mean variance thereof is 5.1° C.; the surface defect rate of finished products is 6.0%.

In Example 6, the first induction heater uses a plate temperature-feedback power control mode, and the second induction heater uses an initial power mode. The mean plate temperature at the outlet of the first heating section is 500.3° C., and the mean variance thereof is 5.1° C., which are similar to those of Comparative Example 6. Compared with Comparative Example 6, since the second heating section of Example 6 uses plate temperature feedback control, the mean variance of the outlet plate temperature is reduced to 0.08° C. Due to the improved stability of the plate temperature at the outlet of the second heating section, the initial plate power of the second induction heater can be increased to reduce the fluctuation of the plate temperature at the outlet of the third heating section. The mean plate temperature at the outlet of the third heating section is 729.8° C., and the mean variance thereof is 1.3° C. The mean plate temperature at the outlet is closer to the target Curie temperature of the strip steel, and the surface defect rate in finished products is reduced to 1.5%.

In Example 7, the first induction heater uses a plate temperature-feedback power control mode, and the second induction heater uses a plate temperature-compensation power control mode. A third plate thermometer for compensating the plate temperature and a third plate thermometer for monitoring the plate temperature are provided between the third heating section and the fourth heating section. The predetermined value $T_{3A}$ of the third target plate temperature is set to 733° C. The plate temperature fluctuation at the outlet of the third heating section is further reduced compared with Example 6. The thermometer for monitoring shows that the mean plate temperature at the outlet of the third heating section is 730.5° C., and the mean variance thereof is 1.0° C., and the surface defect rate in finished products is reduced to <0.5%.

In Example 8, the first induction heater uses a plate temperature-feedback power control mode, the second induction heater uses an impedance-compensation power control mode, and the target impedance $Z_{2A}$ is set to 1.6. The control precision of the plate temperature at the outlet of the third heating section is high, as in Example 7. The mean plate temperature at the outlet is 733.1° C., the mean variance thereof is 0.6° C., and the surface defect rate in finished products is reduced to <0.5%.

Thus, compared with Comparative Example 6, the control precision of the plate temperature at the outlet of the second heating section and the plate temperature at the outlet of the third heating section in Examples 6 to 8 are significantly improved, and the surface defect rate in finished products is also significantly reduced.

Embodiment 3

The Embodiment 3 adopts the same manufacturing steps as the Embodiment 1, but changes the control modes of the second heating section and the third heating section. Comparative Examples 7 and 8 use conventional radiant tubes for heating, and Comparative Examples 9 to 11 use the annealing equipment described in Chinese Patent (CN101652485A) for heating. In Examples 9 to 13, the apparatus for rapidly heating cold-rolled strip steel of the present invention is used for heating, the first induction heater adopts a plate temperature-feedback power control mode, and the second induction heater adopts an impedance-compensation power control mode. The test data of the above experiments were collected and listed in Table 3.

TABLE 3

Comparison of test data under different experimental conditions and heating power control modes

| | Cold-rolled thickness (mm) | Unit speed (m/min) | Plate temperature at outlet of first heating section (° C.) | Plate temperature at outlet of second heating section (° C.) | Plate temperature at outlet of third heating section (° C.) | Carbon content after decarburization (ppm) | Induction $B_8$ (T) | Iron loss $P_{17/50}$ (W/kg) | Surface defect rate (%) |
|---|---|---|---|---|---|---|---|---|---|
| Comparative Example 7 | 0.29 | 90 | — | — | — | <30 | 1.916 | 0.974 | 6.0% |

TABLE 3-continued

Comparison of test data under different experimental conditions and heating power control modes

| | Cold-rolled thickness (mm) | Unit speed (m/min) | Plate temperature at outlet of first heating section (° C.) | Plate temperature at outlet of second heating section (° C.) | Plate temperature at outlet of third heating section (° C.) | Carbon content after decarburization (ppm) | Induction $B_8$ (T) | Iron loss $P_{17/50}$ (W/kg) | Surface defect rate (%) |
|---|---|---|---|---|---|---|---|---|---|
| Comparative Example 8 | 0.29 | 95 | — | — | — | 48 | 1.865 | 1.123 | 10.5% |
| Comparative Example 9 | 0.29 | 90 | 590~610 | 723~733 | — | <30 | 1.918 | 0.968 | 1.5% |
| Comparative Example 10 | 0.29 | 95 | 610~630 | 725~735 | — | 39 | 1.905 | 0.996 | 2.4% |
| Comparative Example 11 | 0.35 | 80 | 640~660 | 716~728 | — | 43 | 1.884 | 1.123 | 3.7% |
| Example 9 | 0.22 | 110 | 530~550 | 599~601 | 730~736 | <30 | 1.932 | 0.837 | <0.5% |
| Example 10 | 0.29 | 90 | 490~510 | 599~601 | 730~736 | <30 | 1.935 | 0.942 | <0.5% |
| Example 11 | 0.29 | 95 | 510~530 | 609~611 | 730~736 | <30 | 1.938 | 0.947 | <0.5% |
| Example 12 | 0.29 | 98 | 530~540 | 619~621 | 730~736 | <30 | 1.928 | 0.953 | <0.5% |
| Example 13 | 0.35 | 80 | 570~590 | 659~661 | 727~733 | <30 | 1.927 | 1.097 | <0.5% |

As shown in Table 3, in Comparative Example 7, the cold-rolled thickness is 0.29 mm, the unit speed is 90 m/min, the carbon content after decarburization meets the requirement of less than 30 ppm, the magnetic induction Bs of finished products is 1.916T, the iron loss $P_{17/50}$ is 0.974 W/Kg, and the surface defect rate is 6.0%. In Comparative Example 8, the unit speed is 95 m/min, the decarburization time is reduced due to the increase of the unit speed, resulting in poor decarburization effect, with the carbon content after decarburization being 48 ppm, the magnetic induction Bs of finished products is 1.865 T, the iron loss $P_{17/50}$ is 1.123 W/Kg, and the surface defect rate is 10.5%.

In Comparative Example 9, the cold-rolled thickness is 0.29 mm, the unit speed is 90 m/min, the plate temperature at the outlet of the first heating section is 590-610° C., the plate temperature at the outlet of the second heating section is 723-733° C., the carbon content of the cold-rolled plate after decarburization meets the requirement of less than 30 ppm, the magnetic induction Bs of finished products is 1.918 T, the iron loss $P_{17/50}$ is 0.968 W/Kg, and the surface defect rate is 1.5%. In Comparative Example 10, the cold-rolled thickness is 0.29 mm, the unit speed is 95 m/min, the plate temperature at the outlet of the first heating section is 610-630° C., the plate temperature at the outlet of the second heating section is 725-735° C., the carbon content of the cold-rolled plate after decarburization is 39 ppm, the magnetic induction Bs of finished products is 1.905 T, the iron loss $P_{17/50}$ is 0.996 W/Kg, and the surface defect rate is 2.4%. In Comparative Example 11, the cold-rolled thickness is 0.35 mm, the unit speed is 80 m/min, the plate temperature at the outlet of the first heating section is 640-660° C., the plate temperature at the outlet of the second heating section is 716-728° C., the carbon content after decarburization is 43 ppm, the magnetic induction Bs of finished products is 1.884 T, the iron loss $P_{17/50}$ is 1.123 W/Kg, and the surface defect rate is 3.7%.

In Example 9, the cold-rolled thickness is 0.22 mm, the unit speed is 110 m/min, the plate temperature at the outlet of the first heating section is 530-550° C., the plate temperature at the outlet of the second heating section is 599-601° C., the plate temperature at the outlet of the third heating section is 730-736° C., the carbon content after decarburization meets the requirement of less than 30 ppm, the magnetic induction Bs of finished products is 1.932 T, the iron loss $P_{17/50}$ is 0.837 W/Kg, and the surface defect rate is less than 0.5%.

In Example 10, the cold-rolled thickness is 0.29 mm, the unit speed is 90 m/min, the plate temperature at the outlet of the first heating section is 490-510° C., the plate temperature at the outlet of the second heating section is 599-601° C., the plate temperature at the outlet of the third heating section is 730-736° C., the carbon content after decarburization meets the requirement of less than 30 ppm, the magnetic induction Bs of finished products is 1.935 T, the iron loss $P_{17/50}$ is 0.942 W/Kg, and the surface defect rate is less than 0.5%.

Compared with Example 10, the unit speed of Example 11 is increased to 95 m/min. In Example 11, the plate temperature at the outlet of the first heating section is 510-530° C., the plate temperature at the outlet of the second heating section is 609-611° C., the plate temperature at the outlet of the third heating section is 730-736° C., the carbon content after decarburization meets the requirement of less than 30 ppm, the magnetic induction Bs of finished products is 1.938 T, the iron loss $P_{17/50}$ is 0.947 W/Kg, and the surface defect rate is less than 0.5%.

Compared with Example 11, the unit speed of Example 12 is further increased to 98 m/min. In Example 12, the plate temperature at the outlet of the first heating section is 530-550° C., the plate temperature at the outlet of the second heating section is 619-621° C., the plate temperature at the outlet of the third heating section is 730-736° C., the carbon content after decarburization meets the requirement of less than 30 ppm, the magnetic induction Bs of finished products is 1.928 T, the iron loss $P_{17/50}$ is 0.953 W/Kg, and the surface defect rate is less than 0.5%.

In Example 13, the cold-rolled thickness is 0.35 mm, the unit speed is 80 m/min, the plate temperature at the outlet of the first heating section is 570-590° C., the plate temperature at the outlet of the second heating section is 659-661° C., the plate temperature at the outlet of the third heating section is 727-733° C., the carbon content after decarburization meets the requirement of less than 30 ppm, the magnetic induction Bs of finished products is 1.927 T, the iron loss $P_{17/50}$ is 1.097 W/Kg, and the surface defect rate is less than 0.5%.

As can be concluded that, compared with the prior art, the examples of the present invention have flexible process settings, excellent magnetic performance of finished products, low surface defect rate, and can further increase the unit speed to improve production efficiency.

In summary, the apparatus and method for rapidly heating cold-rolled strip steel according to the examples of the present invention can make full use of the characteristics of fast heating rate of high-frequency induction heating. The examples of the present invention adopt a mode of segmented temperature control of the plate to strictly implement the heating system, can effectively overcome the influence of surface state fluctuations and heating condition fluctuations of the strip steel, and thus have high precision in controlling the plate temperature. Therefore, the finished product has excellent magnetic properties and surface quality. In addition, in the examples of the present invention, the target plate temperature of each heating section can be selected very conveniently, and the heating is performed at a segmented heating rate, which also enhances the flexibility of process settings and the adaptability of product specifications. In addition, the apparatus and method for rapidly heating a cold-rolled strip steel provided in the examples of the present invention are not only applicable to rapidly heating a cold-rolled strip steel of oriented silicon steel having a Si content of 4.5 mass % or less, but also for any kind of cold-rolled strip steel with Curie point, such as ferritic stainless steel or martensitic stainless steel having a Cr content of 18 mass % or less.

The above is only schematic descriptions of the present invention. Those skilled in the art would understand that various modifications can be made to the present invention without departing from the working principle of the present invention, and such modifications all belong to the protection scope of the present invention.

The invention claimed is:

1. An apparatus for heating cold-rolled strip steel, comprising a heating zone, a soaking zone, and a cooling zone, wherein the heating zone is divided into a first heating section, a second heating section, a third heating section, and a fourth heating section sequentially along a moving direction of the strip steel to be heated,
    wherein the First heating section is provided with a first radiant heater utilizing gas heating or electric heating, and the first heating section is configured to heat the strip steel to a temperature in a range between 200° C. and 100° C. below a target Curie temperature;
    wherein the second heating section is provided with a first induction heater with a first induction coil, and the second heating section is configured to heat the strip steel to a temperature in a range between 300° C. and 50° C. below the target Curie temperature,
    wherein the third heating section is provided with a second induction heater with a second induction coil, and the third heating section is configured to heat the strip steel to a temperature in a range between 30° C. below the target Curie temperature and 3° C. below the target Curie temperature;
    wherein the fourth heating section is provided with a second radiant heater utilizing gas heating or electric heating, and the fourth heating section is configured to heat the strip steel to a temperature above the target Curie temperature; and
    wherein at least one multi-wavelength first plate thermometer is disposed between the first heating section and the second heating section, at least one multi-wavelength second plate thermometer is disposed between the second heating section and the third heating section, and at least one multi-wavelength third plate thermometer is disposed between the third heating section and the fourth heating section.

2. The apparatus for heating cold-rolled strip steel of claim 1, wherein the first induction heater includes a first rectifier, a first inverter, and a first oscillation circuit including a first induction coil connected in sequence, the first inverter receives a first direct current provided by the first rectifier, converts the first direct current into a first high-frequency current, and supplies the first high-frequency current to the first oscillation circuit; the second induction heater includes a second rectifier, a second inverter, and a second oscillation circuit including a second induction coil connected in sequence, the second inverter receives a second direct current provided by the second rectifier, converts the second direct current into a second high-frequency current, and supplies the second high-frequency current to the second oscillation circuit.

3. The apparatus for heating cold-rolled strip steel of claim 1, wherein the first induction heater and the second induction heater have a current frequency in a range of 100-1000 kHz.

4. A method for heating a cold-rolled strip steel, wherein the apparatus for heating a cold-rolled strip steel of claim 1 is used to heat the strip steel to be heated.

5. The method for heating a cold-rolled strip steel of claim 4, wherein a first target plate temperature at an outlet of the first heating section is 400-550° C.

6. The method for heating a cold-rolled strip steel of claim 4, wherein a second target plate temperature at an outlet of the second heating section is set according to a heating rate in the third heating section, wherein the heating rate in the third heating section is 50-150° C/s.

7. The method for heating a cold-rolled strip steel of claim 4, wherein a heating power of the second heating section is controlled by adjusting the heating power of the second heating section according to a comparison result between a second target plate temperature and a detection value from the second plate thermometer.

8. The method for heating a cold-rolled strip steel of claim 4, wherein a heating power of the third heating section is controlled by setting an initial power of the third heating section and a third target plate temperature at an outlet of the third heating section, and adjusting the heating power of the third heating section based on the initial power and a comparison result between the third target plate temperature and a detection value from the third plate thermometer.

9. The method for heating a cold-rolled strip steel of claim 5, wherein a heating power of the third heating section is controlled by setting a target impedance for the third heating section, and adjusting the heating power of the third heating section according to a comparison result between the target impedance and an running impedance of the third heating section.

* * * * *